United States Patent
Manda

(10) Patent No.: US 10,063,750 B2
(45) Date of Patent: Aug. 28, 2018

(54) IMAGE FORMING APPARATUS, IMAGE FORMING METHOD, AND IMAGE FORMING SYSTEM THAT ENSURE REDUCTION OF COLOR UNEVENNESS AND RECORDING MEDIUM THEREFOR

(71) Applicant: Kyocera Document Solutions Inc., Osaka (JP)

(72) Inventor: Etsuko Manda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/609,872

(22) Filed: May 31, 2017

(65) Prior Publication Data

US 2017/0346993 A1 Nov. 30, 2017

(30) Foreign Application Priority Data

May 31, 2016 (JP) .................... 2016-108182

(51) Int. Cl.
G06K 15/00 (2006.01)
H04N 1/40 (2006.01)
H04N 1/60 (2006.01)
H04N 1/00 (2006.01)

(52) U.S. Cl.
CPC ....... *H04N 1/6072* (2013.01); *H04N 1/00023* (2013.01); *H04N 1/00034* (2013.01); *H04N 1/00071* (2013.01); *H04N 1/6008* (2013.01); *H04N 1/6019* (2013.01); *H04N 2201/0094* (2013.01)

(58) Field of Classification Search
CPC ............ H04N 1/6072; H04N 1/00023; H04N 1/00034; H04N 1/00071; H04N 1/6008; H04N 2201/0094
See application file for complete search history.

(56) References Cited

U.S. PATENT DOCUMENTS

2002/0048056 A1* 4/2002 Kubo .................. H04N 1/4015
358/518
2010/0158359 A1* 6/2010 Qiao .................... G06K 9/4652
382/164
2012/0274978 A1* 11/2012 Hahm ................. H04N 1/4051
358/1.15

FOREIGN PATENT DOCUMENTS

JP 2002-135610 A 5/2002

* cited by examiner

*Primary Examiner* — Quang N Vo
(74) *Attorney, Agent, or Firm* — James Judge

(57) ABSTRACT

An image forming apparatus includes a table generating unit. The table generating unit determines whether a target-value Voronoi region and a measured-value Voronoi region are identical or not. The table generating unit sets an output color value associated with a print position where the target-value Voronoi region and the measured-value Voronoi region are identical in the second color conversion table as the output color value associated with a specific input color value in the first color conversion table. The table generating unit sets the output color value associated with the print position where the target-value Voronoi region and the measured-value Voronoi region are different in the second color conversion table as a color value that is a color value in the hue plane and is different from the output color value associated with the specific input color value in the first color conversion table.

7 Claims, 14 Drawing Sheets

IMAGE FORMING APPARATUS, IMAGE FORMING METHOD, AND IMAGE FORMING SYSTEM THAT ENSURE REDUCTION OF COLOR UNEVENNESS AND RECORDING MEDIUM THEREFOR

INCORPORATION BY REFERENCE

This application is based upon, and claims the benefit of priority from, corresponding Japanese Patent Application No. 2016-108182 filed in the Japan Patent Office on May 31, 2016, the entire contents of which are incorporated herein by reference.

BACKGROUND

Unless otherwise indicated herein, the description in this section is not prior art to the claims in this application and is not admitted to be prior art by inclusion in this section.

A typical image forming apparatus such as a multi-function peripheral (MFP) prints with color unevenness depending on print positions in every image forming apparatus, even when an image is printed based on an input image with a single color value. There is known a technique for reducing such color unevenness.

SUMMARY

An image forming apparatus according to one aspect of the disclosure includes a central processing unit (CPU), a print device, a color-measurement device, and a storage device. The print device executes printing on a recording medium. The color-measurement device measures a color value at each print position in the recording medium printed by the print device. The storage device stores an image forming program. The CPU executes the image forming program to function as a color conversion unit and a table generating unit. The color conversion unit converts an input image into an output image for printing by the print device using a color conversion table. The table generating unit generates a second color conversion table based on a first color conversion table. The first color conversion table is the color conversion table that defines a correspondence relationship between input color values as color values of a colorimetric system of the input image and output color values as color values of a colorimetric system of the output image with respect to a specific count of colors. The second color conversion table is the color conversion table that defines a correspondence relationship between the print positions and the output color values corresponding to a specific input color value as one of the input color values. When the color conversion unit converts the input image all over a surface of which is constituted of only the specific input color value into the output image using the first color conversion table, the table generating unit determines whether a target-value Voronoi region and a measured-value Voronoi region are identical or not at each of the print positions in the recording medium printed by the print device, in a Voronoi diagram in a hue plane of the specific input color value that includes a generatrix corresponding to a definition color defined in the first color conversion table. The target-value Voronoi region is a Voronoi region that includes the specific input color value. The measured-value Voronoi region is a Voronoi region that includes a measured value as a color value measured by the color-measurement device. The table generating unit sets the output color value associated with the print position where the target-value Voronoi region and the measured-value Voronoi region are identical in the second color conversion table as the output color value associated with the specific input color value in the first color conversion table. The table generating unit sets the output color value associated with the print position where the target-value Voronoi region and the measured-value Voronoi region are different in the second color conversion table as a color value that is a color value in the hue plane and is different from the output color value associated with the specific input color value in the first color conversion table.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
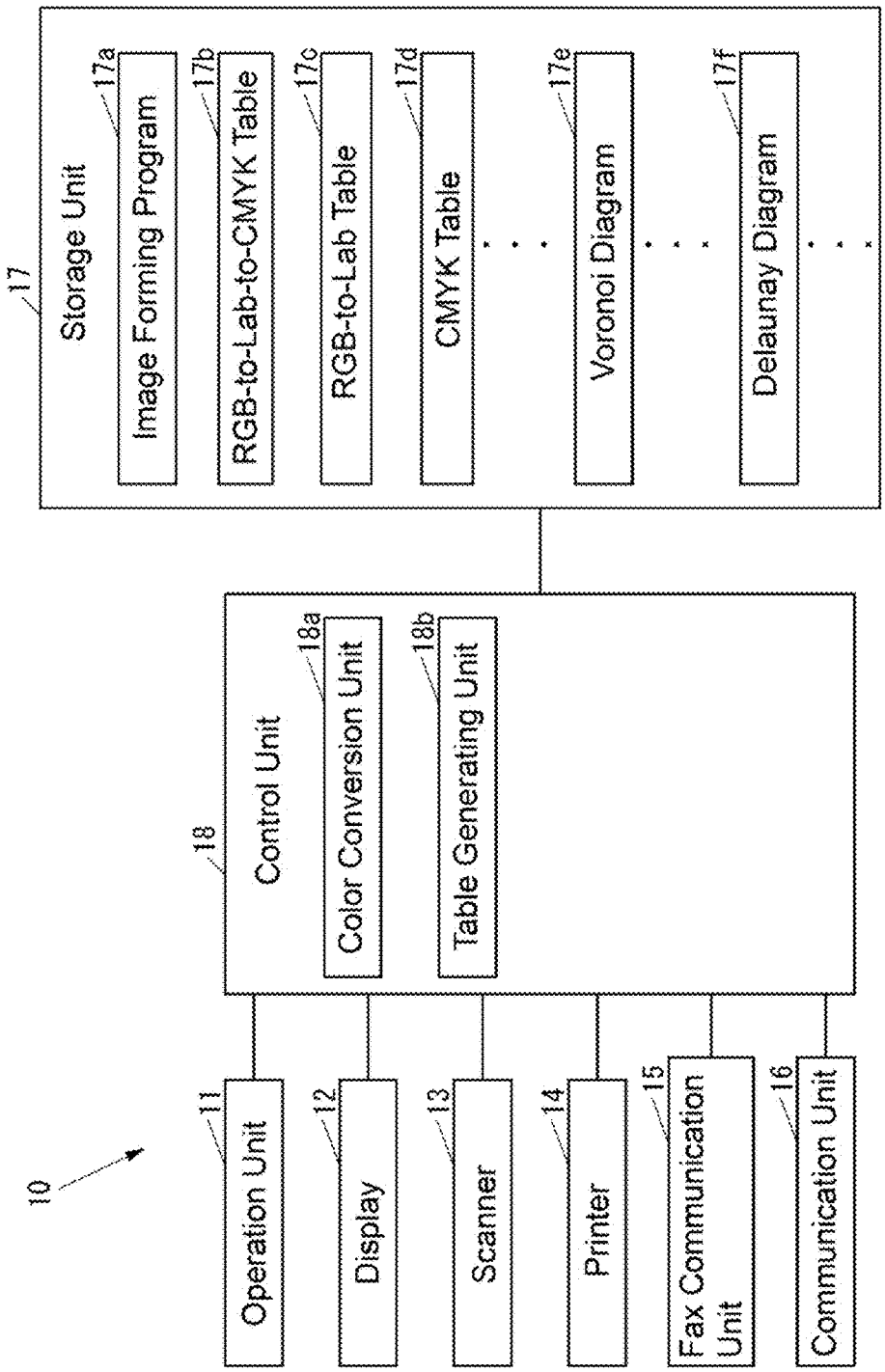
FIG. 1 illustrates a configuration of an MFP according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure referring to the accompanying drawings.

First, a description will be given of a configuration of a multi-function peripheral (MFP) as an image forming apparatus according to the embodiment.

FIG. 1 illustrates a block diagram illustrating a configuration of an MFP 10 according to the embodiment.

As illustrated in FIG. 1, the MFP 10 includes an operation unit 11, a display 12, a scanner 13, a printer 14, a fax communication unit 15, a communication unit 16, a storage unit 17, and a control unit 18. The operation unit 11 is an input device such as a button with which the user inputs various kinds of operations. The display 12 is a display device such as a liquid crystal display (LCD) that displays various kinds of information. The scanner 13 is a reading device that reads an image from a document. The printer 14 is a print device that executes printing on a recording medium such as a paper sheet. The fax communication unit 15 is a fax device that performs fax communication with an external facsimile device (not illustrated) via a communication line such as a dial-up line. The communication unit 16 is a communication device that communicates with an external device via a network such as a local area network (LAN) or the Internet, or directly communicates with an external device by wired communication or wireless communication without a network. The storage unit 17 is a storage device such as a semiconductor memory and a hard disk drive (HDD). The control unit 18 controls the entire MFP 10.

The scanner 13 constitutes a color-measurement device that measures a color value at each print position in a recording medium printed by the printer 14.

The storage unit 17 stores an image forming program 17a executed by the control unit 18. The image forming program 17a may be installed into the MFP 10 at production stage of the MFP 10, may be additionally installed into the MFP 10 from a storage medium such as a SD card, or a universal serial bus (USB) memory, or may be additionally installed into the MFP 10 from a network.

The storage unit 17 stores an RGB-to-Lab-to-CMYK table 17b as a first color conversion table that defines a correspondence relationship between a color value of an RGB colorimetric system as a colorimetric system of an input image, namely an RGB value, a color value of a Lab colorimetric system as a colorimetric system that is independent of a device, namely a Lab value, and a color value of a CMYK colorimetric system as a colorimetric system of an output image for printing by the printer 14, namely a CMYK value, with respect to a specific number of colors.

The storage unit 17 stores an RGB-to-Lab table 17c that defines a correspondence relationship between the color value of the RGB colorimetric system as the colorimetric system of an image read by the scanner 13, namely the RGB value and the color value of the Lab colorimetric system as the colorimetric system that is independent of a device, namely the Lab value, with respect to a specific number of colors.

The storage unit 17 can store a CMYK table 17d as a second color conversion table that defines a correspondence relationship between a print position and a CMYK value corresponding to a specific RGB value, for each RGB value.

The storage unit 17 can store a Voronoi diagram 17e, which will be described later, for each specific hue.

The storage unit 17 can store a Delaunay diagram 17f, which will be described later, for each specific hue.

The control unit 18 includes, for example, a Central Processing Unit (CPU), a read-only memory (ROM) that stores programs and various data, and a random-access memory (RAM) that is used as a work area of the CPU. The CPU executes the program stored in the ROM or the storage unit 17.

By executing the image forming program 17a stored in the storage unit 17, the control unit 18 functions as a color conversion unit 18a that converts an input image into an output image for printing by the printer 14 using the RGB-to-Lab-to-CMYK table 17b or the CMYK table 17d, and a table generating unit 18b that generates the CMYK table 17d based on the RGB-to-Lab-to-CMYK table 17b.

Next, a description will be given of operations of the MFP 10.

First, a description will be given of the operations of the MFP 10 when generating a Voronoi diagram and a Delaunay triangle for each hue.

Figure 2:
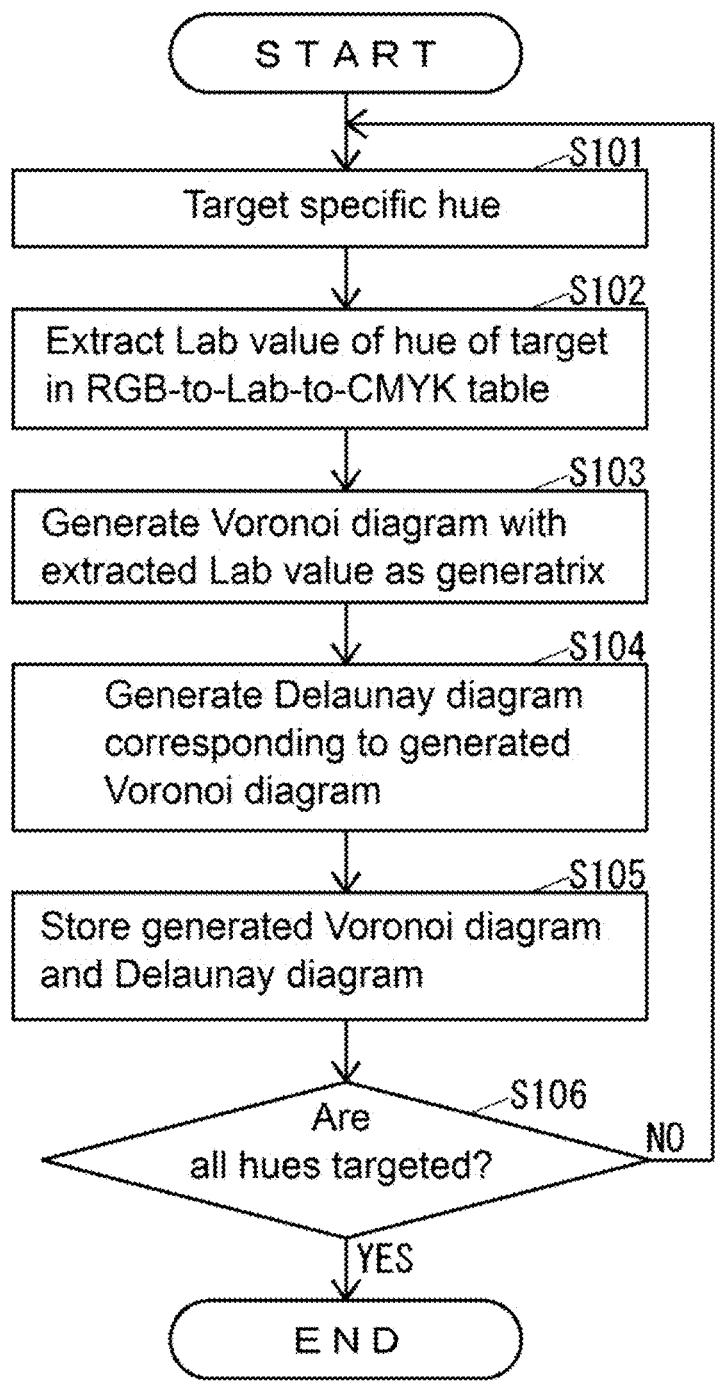
FIG. 2 illustrates operations of the MFP according to the one embodiment when generating a Voronoi diagram and a Delaunay triangle for each hue.

Instructing a start of generation of the Voronoi diagram and the Delaunay triangle for each hue via the operation unit 11 causes the control unit 18 to execute the operations illustrated in FIG. 2 by executing the image forming program 17a.

FIG. 2 illustrates the operations of the MFP 10 when generating the Voronoi diagram and the Delaunay triangle for each hue.

As illustrated in FIG. 2, the table generating unit 18b targets a specific hue in the RGB-to-Lab-to-CMYK table 17b (Step S101).

The table generating unit 18b, of the Lab values in the RGB-to-Lab-to-CMYK table 17b, extracts the Lab value of the hue targeted at Step S101 (Step S102).

The table generating unit 18b generates a Voronoi diagram 40 (see FIG. 3) using the Lab values extracted at Step S102 as generatrices (Step S103).

The Voronoi diagram is a diagram that partitions a closest space from each generatrix, which is present in space, using a hyperplane such as a line and a surface. That is, the Voronoi diagram can be defined as a set of Voronoi regions $\{V(p_1), V(p_2), \ldots, V(p_n)\}$ with respect to a finite subset $P=\{p_1, p_2, \ldots, p_n\}$ within a metric space. Here, the Voronoi region is a region $V(p_i)$ constituted of the following Formula 1 with respect to a distance function d. In the formula shown in Formula 1, $d(p, p_i)$ is a distance between a point p and a point $p_i$, and $d(p, p_j)$ is a distance between a point p and a point $p_j$.

$$V(p_i)=\{p \mid d(p,p_i) \leq d(p,p_j), i \neq j\}$$ Formula 1

The Voronoi diagram has, for example, the following features: a Voronoi side is a perpendicular bisector of adjacent generatrices; and a Voronoi seed is a center of a circle that passes through three adjacent generatrices.

Figure 3:
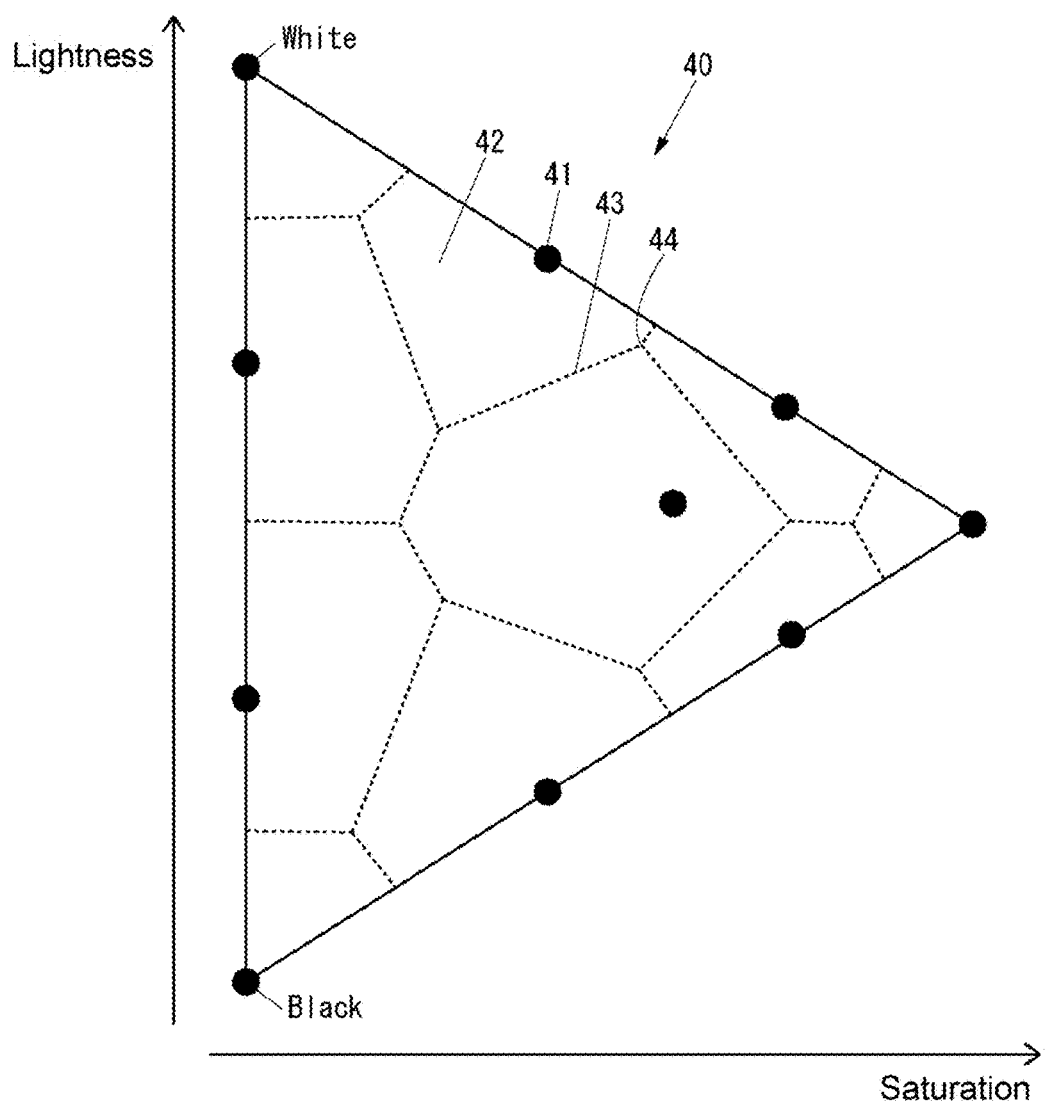
FIG. 3 illustrates one example of the Voronoi diagram generated in the operations illustrated in FIG. 2.

FIG. 3 illustrates one example of the Voronoi diagram 40 generated at Step S103.

As illustrated in FIG. 3, the Voronoi diagram 40 includes generatrices 41, Voronoi regions 42 that each include the generatrix 41, Voronoi sides 43 that partition the Voronoi regions 42, and Voronoi seeds 44 that are intersection points between the Voronoi sides 43.

As illustrated in FIG. 2, after the process of Step S103, the table generating unit 18b generates a Delaunay diagram 50 (see FIG. 4) that corresponds to the Voronoi diagram 40 generated at Step S103 (Step S104).

The Delaunay diagram is a diagram that connects the generatrices of the Voronoi regions adjacent with one another in the Voronoi diagram.

Figure 4:
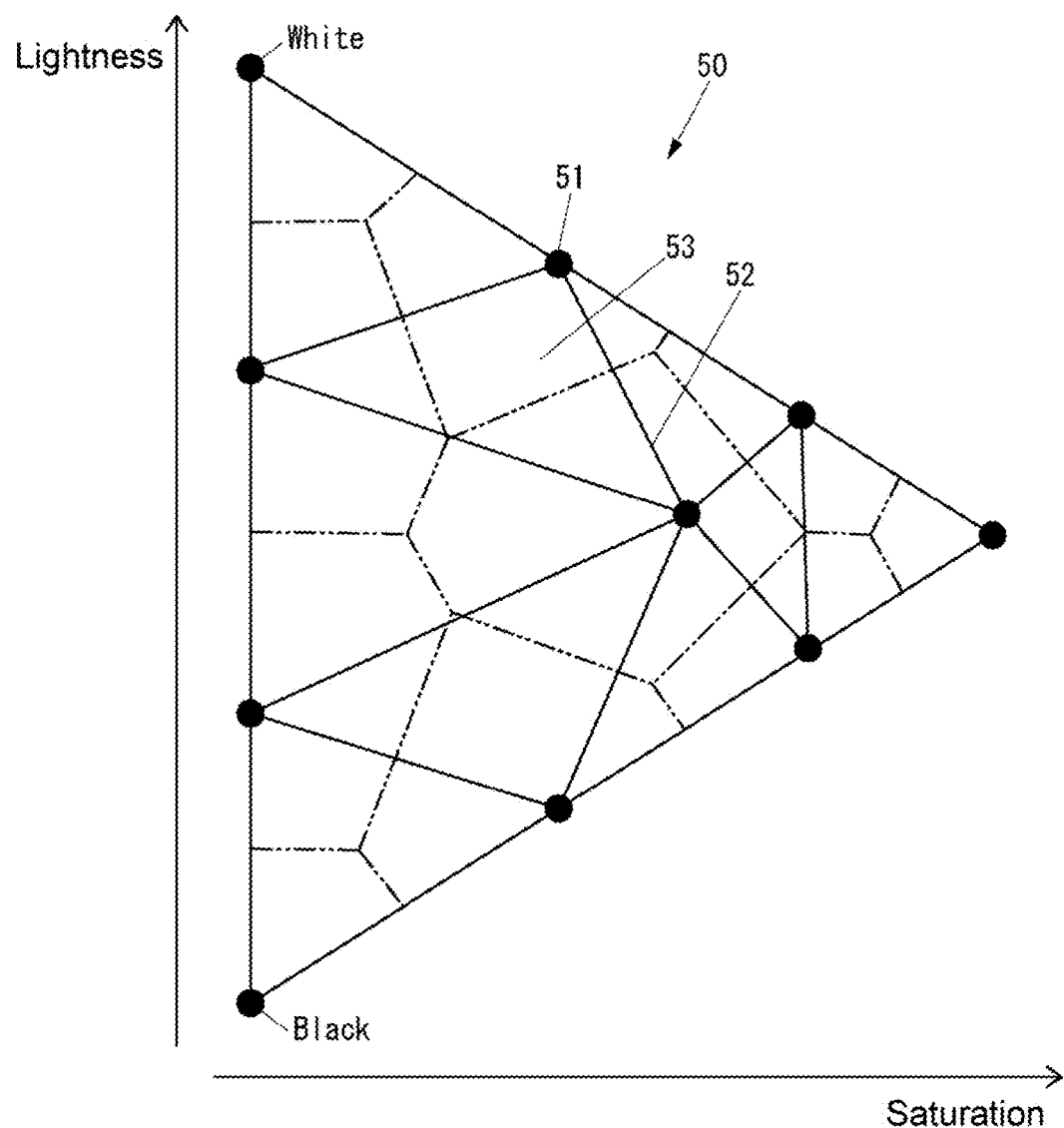
FIG. 4 illustrates one example of the Delaunay diagram generated in the operations illustrated in FIG. 2.

FIG. 4 illustrates one example of the Delaunay diagram 50 generated at Step S104.

As illustrated in FIG. 4, the Delaunay diagram 50 includes Delaunay points 51, which are identical to the generatrices 41 (see FIG. 3) in the Voronoi diagram 40 (see FIG. 3), and Delaunay sides 52 that connect the Delaunay points 51 to one another. The Delaunay diagram 50 is formed by a Delaunay triangle 53 that is formed by three Delaunay sides 52.

As illustrated in FIG. 2, after the process of Step S104, the table generating unit 18b stores the Voronoi diagram 40 generated at Step S103 and the Delaunay diagram 50 generated at Step S104 in the storage unit 17, as the Voronoi diagram 17e and the Delaunay diagram 17f of the hue targeted at Step S101 (Step S105).

Subsequently, the table generating unit 18b determines whether all hues in the RGB-to-Lab-to-CMYK table 17b are targeted or not (Step S106).

When determining that the hue that has not yet been targeted is present at Step S106, the table generating unit 18b executes the process of Step S101.

When determining that all the hues have been targeted at Step S106, the table generating unit 18b terminates the operations illustrated in FIG. 2.

When already storing the Voronoi diagram 17e and the Delaunay diagram 17f for each of all the hues in the RGB-to-Lab-to-CMYK table 17b in the storage unit 17, the MFP 10 does not have to execute the operations illustrated in FIG. 2. Here, the Voronoi diagram 17e and the Delaunay diagram 17f for each of all the hues in the RGB-to-Lab-to-CMYK table 17b may be generated outside the MFP 10 and stored in the storage unit 17 of the MFP 10. For example, the Voronoi diagram 17e and the Delaunay diagram 17f for each of all the hues in the RGB-to-Lab-to-CMYK table 17b may be stored in the storage unit 17 of the MFP 10 from an external device of the MFP 10 together with the RGB-to-Lab-to-CMYK table 17b.

Next, a description will be given of operations of the MFP 10 when measuring color values at print positions of a printed matter all over the surface of which is printed with only a color value of a correction target.

Figure 5:
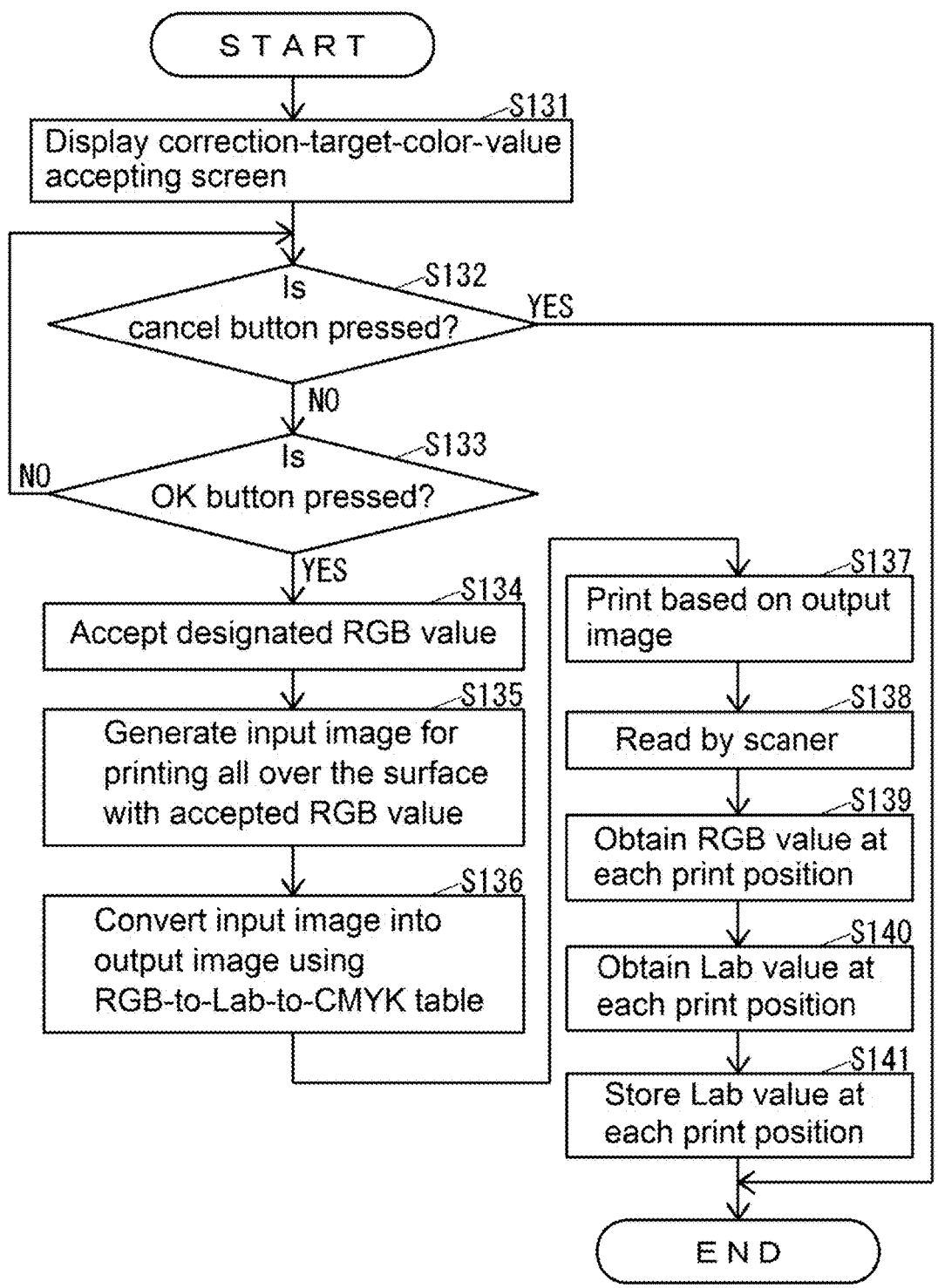
FIG. 5 illustrates the operations of the MFP according to the one embodiment when the MFP measures color values at print positions of a printed matter all over the surface of which has been printed with only a color value of a correction target.

Instructing a start of measurement of the color values at the print positions of the printed matter, all over the surface of which is printed with only the color value of the correction target, via the operation unit 11 causes the control unit 18 to execute the operations illustrated in FIG. 5, by executing the image forming program 17a.

FIG. 5 illustrates operations of the MFP 10 when measuring the color value by the print position of the printed matter, all over the surface of which is printed with only the color value of the correction target.

As illustrated in FIG. 5, the table generating unit 18b displays a correction-target-color-value accepting screen 60 (see FIG. 6) for accepting the color value of the correction target on the display 12 (Step S131).

Figure 6:
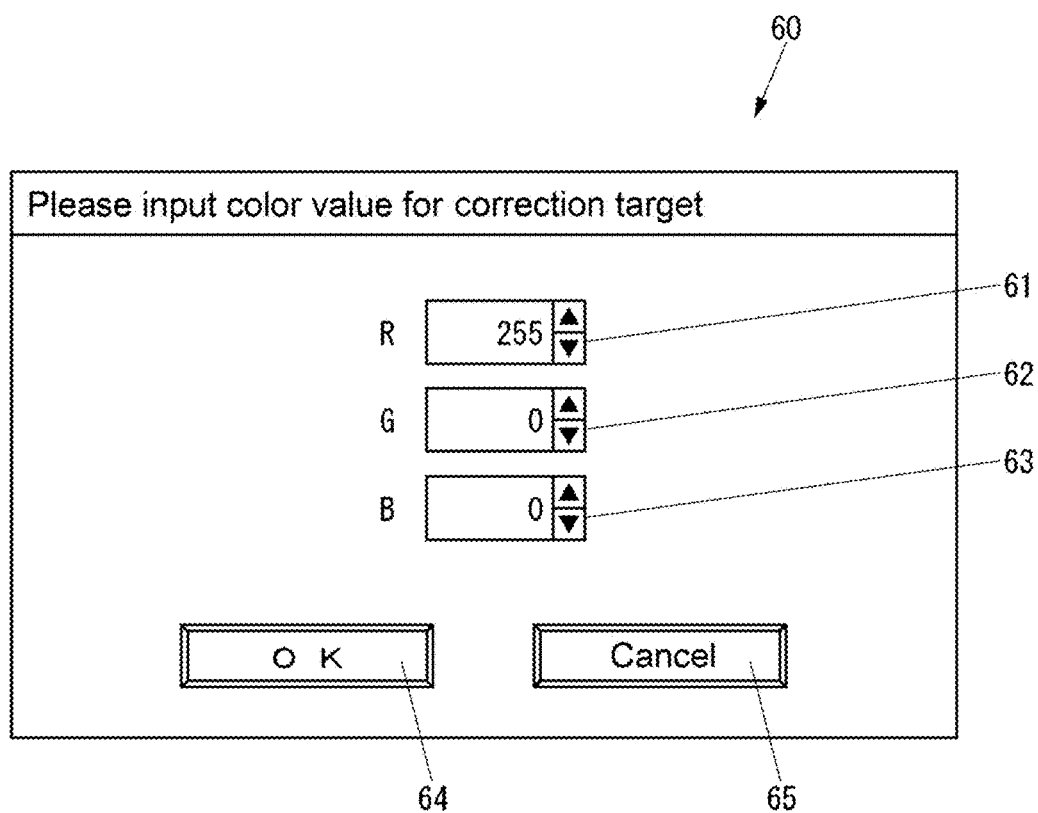
FIG. 6 illustrates one example of a correction-target-color-value accepting screen displayed on a display according to the one embodiment.

FIG. 6 illustrates one example of the correction-target-color-value accepting screen 60.

The correction-target-color-value accepting screen 60 illustrated in FIG. 6 includes: a spin box 61 for accepting a R value of the color value of the correction target; a spin box 62 for accepting a G value of the color value of the correction target; a spin box 63 for accepting a B value of the color value of the correction target; an OK button 64 for accepting the color value designated by the spin boxes 61 to 63; and a cancel button 65 for terminating the acceptance of the color value designated by the spin boxes 61 to 63. The spin boxes 61 to 63 each ensure input of integers from zero to 255.

As illustrated in FIG. 5, after the process of Step S131, the table generating unit 18b determines whether the cancel button 65 is pressed or not (Step S132).

When determining that the cancel button 65 is pressed at Step S132, the table generating unit 18b terminates the operations illustrated in FIG. 5.

When determining that the cancel button 65 is not pressed at Step S132, the table generating unit 18b determines whether the OK button 64 is pressed or not (Step S133).

When determining that the OK button 64 is not pressed at Step S133, the table generating unit 18b executes the process of Step S132.

When determining that the OK button 64 is pressed at Step S133, the table generating unit 18b accepts the color value designated by the spin boxes 61 to 63 at the time when the table generating unit 18b determines that the OK button 64 is pressed (Step S134).

Subsequently, the table generating unit 18b generates an input image for printing all over the surface of the recording medium with the color value accepted at Step S134 (Step S135).

Subsequently, the color conversion unit 18a converts the input image generated at Step S135 into an output image using the RGB-to-Lab-to-CMYK table 17b (Step S136) and then executes printing based on the output image generated at Step S136 with the printer 14 (Step S137).

Then, after setting the printed matter, which has been printed at Step S137, to the scanner 13, a user can instruct the MFP 10 to continue the process from the operation unit 11.

Consequently, the table generating unit 18b reads the printed matter with the scanner 13 (Step S138), and then obtains "the RGB value at each print position" based on the image read by the scanner 13 at Step S138 (Step S139).

Subsequently, after obtaining "the Lab value at each print position" by converting the RGB value obtained at Step S139 into the Lab value using the RGB-to-Lab table 17c (Step S140), the table generating unit 18b stores "the Lab value at each print position" obtained at Step S140 in the storage unit 17 (Step S141), and then terminates the operations illustrated in FIG. 5.

Next, a description will be given of operations of the MFP 10 when generating the CMYK table 17d relative to a specific RGB value.

Figure 7:
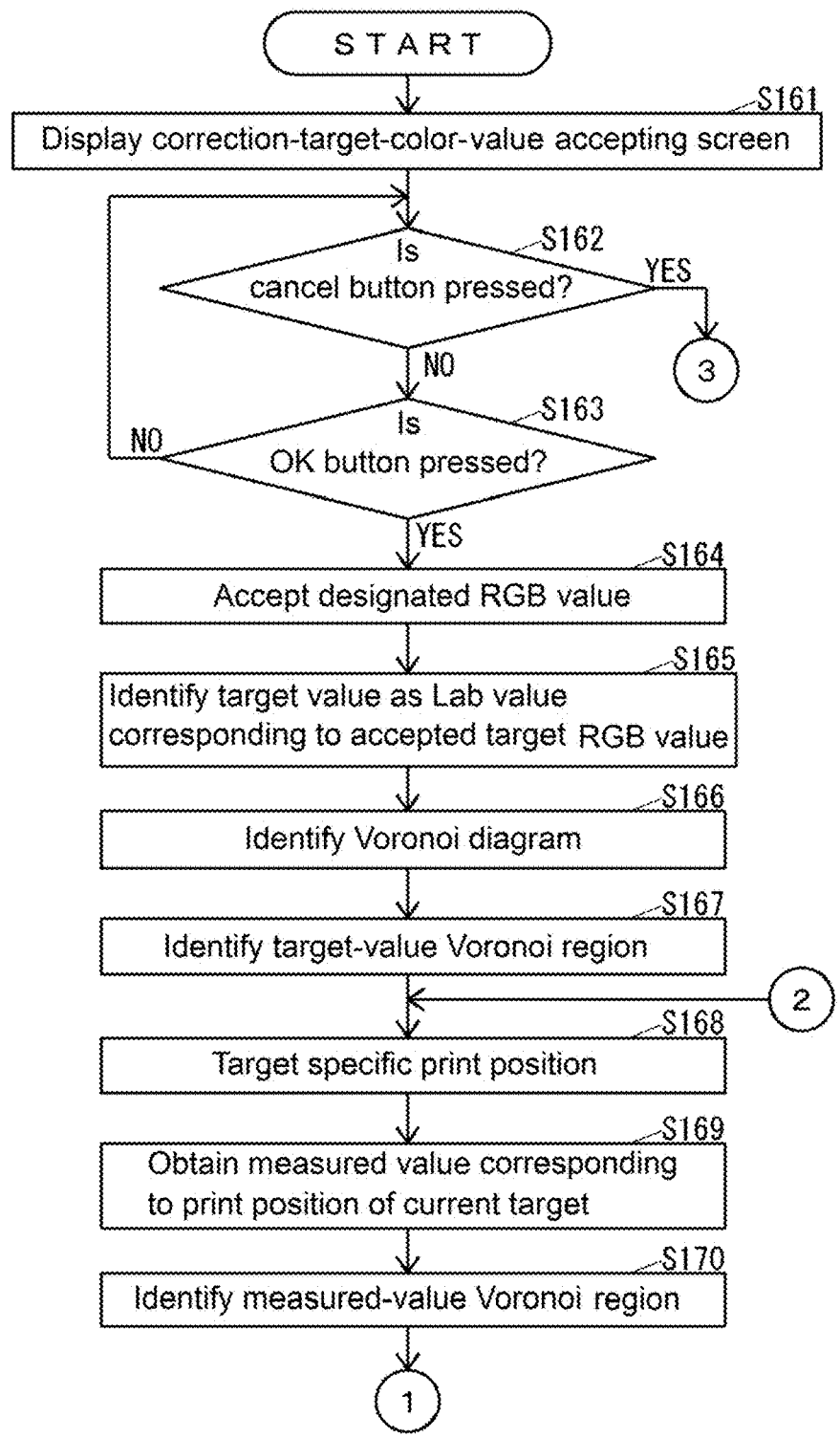
FIG. 7 illustrates a part of operations of the MFP according to the one embodiment when the MFP generates a CMYK table relative to a specific RGB value.
Figure 8:
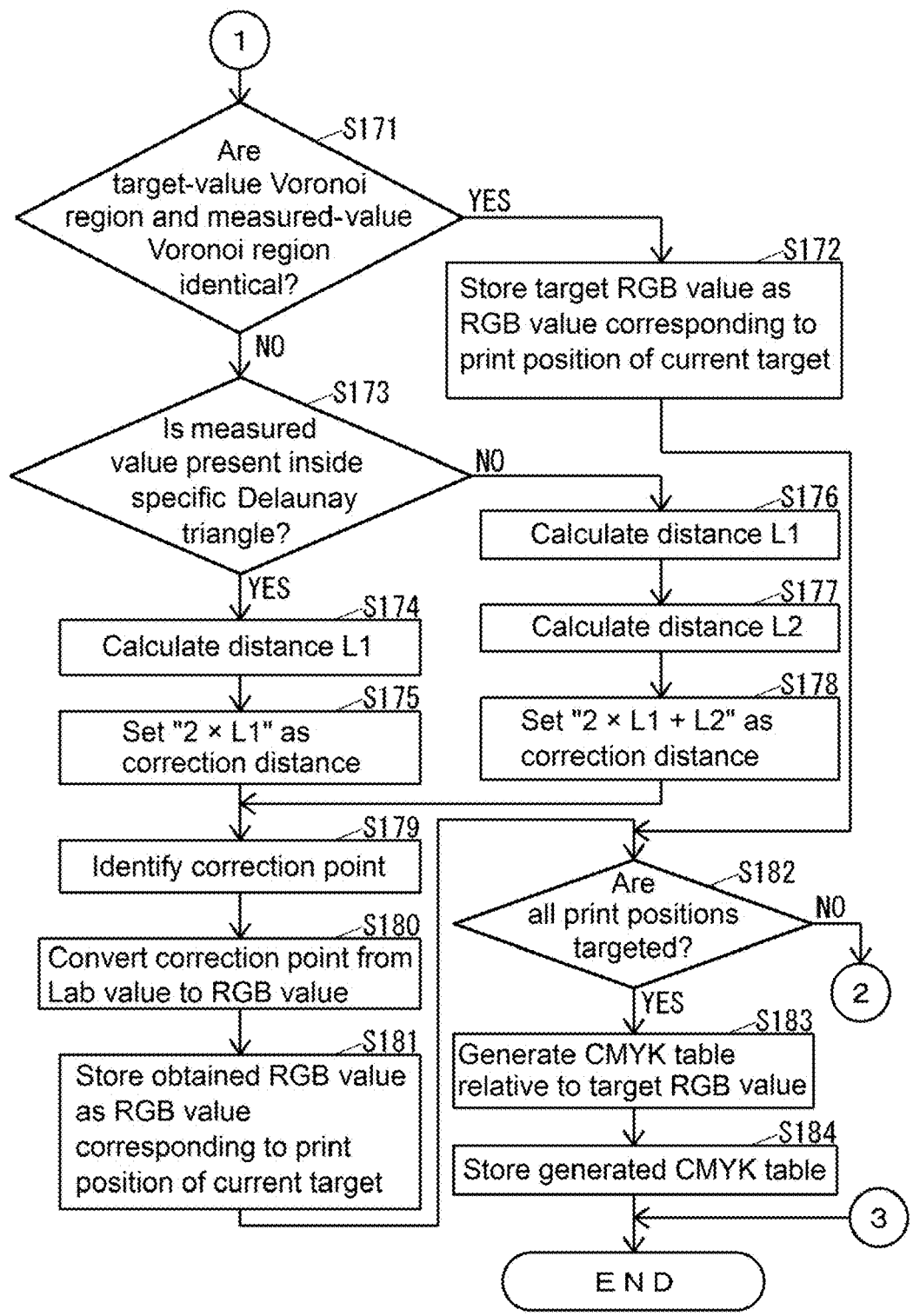
FIG. 8 illustrates a part that is a part of the operations of the MFP according to the one embodiment and is different from the part illustrated in FIG. 7 when the MFP generates the CMYK table relative to the specific RGB value.

Instructing a start of generation of the CMYK table 17d relative to the specific RGB value via the operation unit 11 causes the control unit 18 to execute the operations illustrated in FIGS. 7 and 8 by executing the image forming program 17a.

FIG. 7 illustrates a part of operations of the MFP 10 when generating the CMYK table 17d relative to the specific RGB value. FIG. 8 illustrates a part that is a part of operations of the MFP 10 when generating the CMYK table 17d relative to the specific RGB value and is different from the part illustrated in FIG. 7.

As illustrated in FIGS. 7 and 8, the table generating unit 18b displays the correction-target-color-value accepting screen 60 (see FIG. 6) on the display 12 (Step S161).

Subsequently, after the process of Step S161, the table generating unit 18b determines whether the cancel button 65 is pressed or not (Step S162).

When determining that the cancel button 65 is pressed at Step S162, the table generating unit 18b terminates the operations illustrated in FIG. 5.

When determining that the cancel button 65 is not pressed at Step S162, the table generating unit 18b determines whether the OK button 64 is pressed or not (Step S163).

When determining that the OK button 64 is not pressed at Step S163, the table generating unit 18b executes the process of Step S162.

When determining that the OK button 64 is pressed at Step S163, the table generating unit 18b accepts the color value designated by the spin boxes 61 to 63 at the time when the table generating unit 18b determines that the OK button 64 is pressed (Step S164).

Subsequently, the table generating unit 18b identifies the Lab value (hereinafter referred to as a "target value") associated with the RGB value (hereinafter referred to as a "target RGB value") accepted at Step S164 as a definition color in the RGB-to-Lab-to-CMYK table 17b (Step S165), identifies the Voronoi diagram 17e associated with the hue of the identified target value (Step S166), and then identifies the Voronoi region (hereinafter referred to as a "target-value Voronoi region") in which the target value is included as the generatrix in the identified Voronoi diagram 17e (Step S167).

Subsequently, the table generating unit 18b targets a specific print position that is printable on the recording medium by the printer 14 (Step S168).

Subsequently, the table generating unit 18b obtains the Lab value (hereinafter referred to as a "measured value") corresponding to the print position of the current target based on the "Lab value at each print position" stored by the operations illustrated in FIG. 5 relative to the target RGB value (Step S169).

Subsequently, in the Voronoi diagram 17e identified at Step S166, the table generating unit 18b identifies the Voronoi region (hereinafter referred to as a "measured-value Voronoi region") in which the measured value obtained at Step S169 is included (Step S170).

Subsequently, the table generating unit 18b determines whether the target-value Voronoi region and the measured-value Voronoi region are identical or not (Step S171).

When determining that the target-value Voronoi region and the measured-value Voronoi region are identical at Step S171, the table generating unit 18b stores the target RGB value as the RGB value corresponding to the print position of the current target (Step S172).

Figure 9:
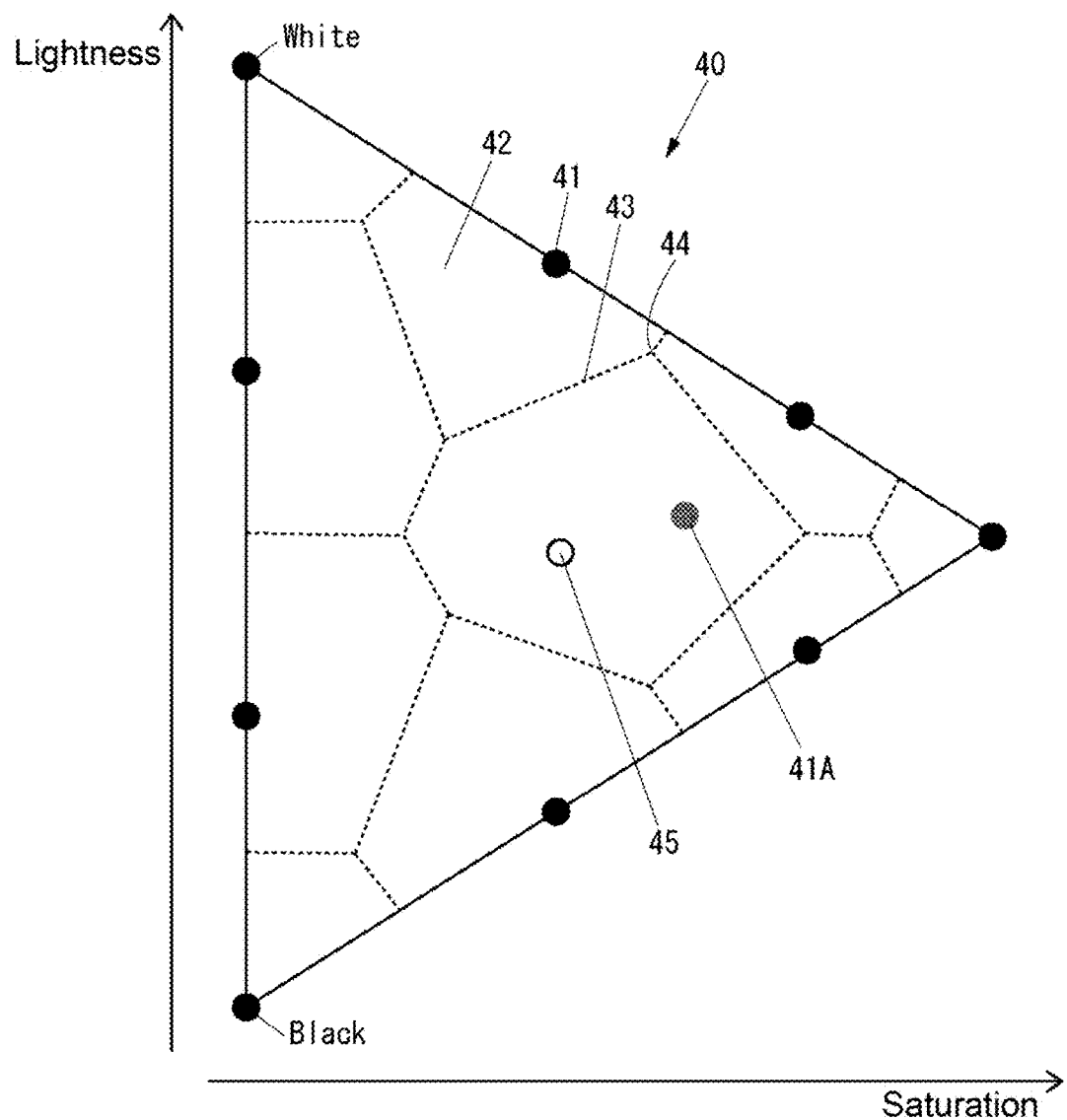
FIG. 9, in the operations illustrated in FIGS. 7 and 8, illustrates one example of a Voronoi diagram when a target-value Voronoi region and a measured-value Voronoi region are identical.

FIG. 9 illustrates one example of the Voronoi diagram 40 when the target-value Voronoi region and the measured-value Voronoi region are identical.

In FIG. 9, the Voronoi region 42 in which a generatrix 41A as the target value is included, namely the target-value Voronoi region, and the Voronoi region 42 in which a measured value 45 is included, namely the measured-value Voronoi region are identical.

As illustrated in FIGS. 7 and 8, when determining that the target-value Voronoi region and the measured-value Voronoi region are not identical at Step S171, the table generating unit 18b determines whether the measured value is present inside of any of two Delaunay triangles that have vertices of the target value, namely the generatrix of the target-value Voronoi region, and the generatrix of the measured-value Voronoi region or not (Step S173).

Figure 10A:
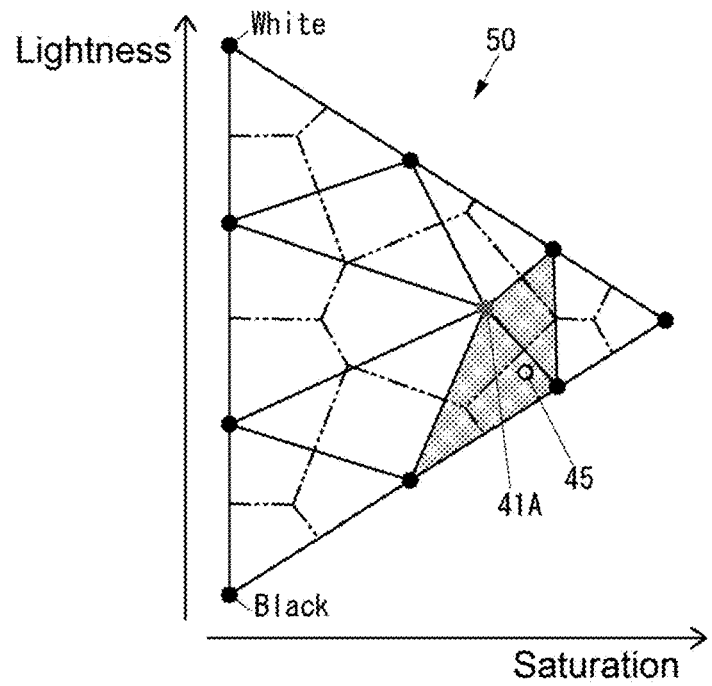
FIG. 10A, in the operations illustrated in FIGS. 7 and 8, illustrates one example of a Delaunay diagram indicative of a measured value when the measured value is present inside a Delaunay triangle that has vertices of a target value and a generatrix of a measured-value Voronoi region.
Figure 10B:
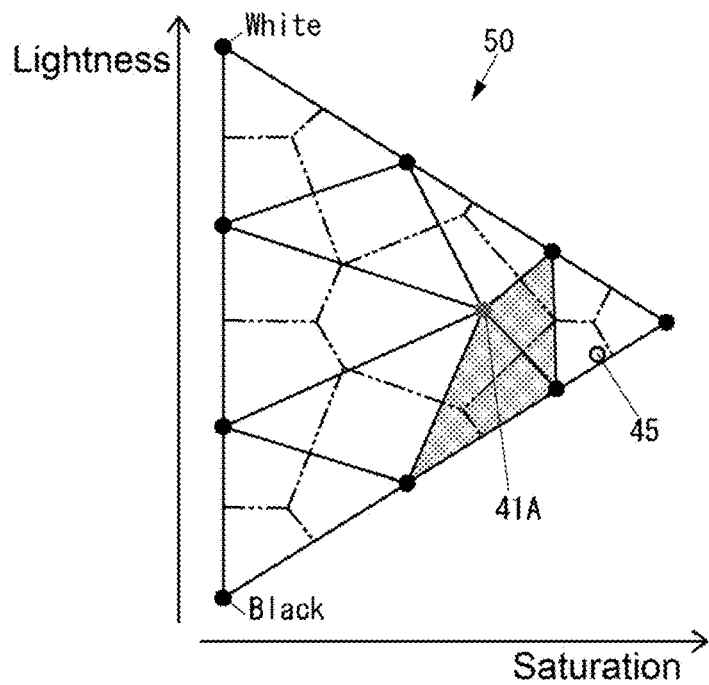
FIG. 10B, in the operations illustrated in FIGS. 7 and 8, illustrates one example of the Delaunay diagram indicative of a measured value when the measured value is not present inside the Delaunay triangle that has the vertices of the target value and the generatrix of the measured-value Voronoi region.

FIG. 10A illustrates one example of the Delaunay diagram 50 that indicates the measured value when the measured value is present inside the Delaunay triangles that have vertices of the target value and the generatrix of the measured-value Voronoi region. FIG. 10B illustrates one example of the Delaunay diagram 50 that indicates the measured value when the measured value is not present inside the Delaunay triangles that have vertices of the target value and the generatrix of the measured-value Voronoi region.

In FIGS. 10A to 10B, the Delaunay triangles that have the vertices of the target value and the generatrix of the measured-value Voronoi region are illustrated with half-tone dot meshing.

In FIG. 10A, the measured value 45 is present inside one of the two Delaunay triangles 53 that have the vertices of the generatrix 41A as the target value and the generatrix 41 of the measured-value Voronoi region, namely the Voronoi region 42 that includes the measured value 45.

In FIG. 10B, the measured value 45 is not present inside any one of the two Delaunay triangles 53 that have the vertices of the generatrix 41A as the target value and the generatrix 41 of the measured-value Voronoi region, namely the Voronoi region 42 that includes the measured value 45.

As illustrated in FIGS. 7 and 8, when determining that the measured value is present inside at Step S173, the table generating unit 18b calculates a distance L1 between the target value and the generatrix of the measured-value Voronoi region (Step S174), and then calculates a correction distance by doubling the distance L1 calculated at Step S174 (Step S175).

Figure 11:
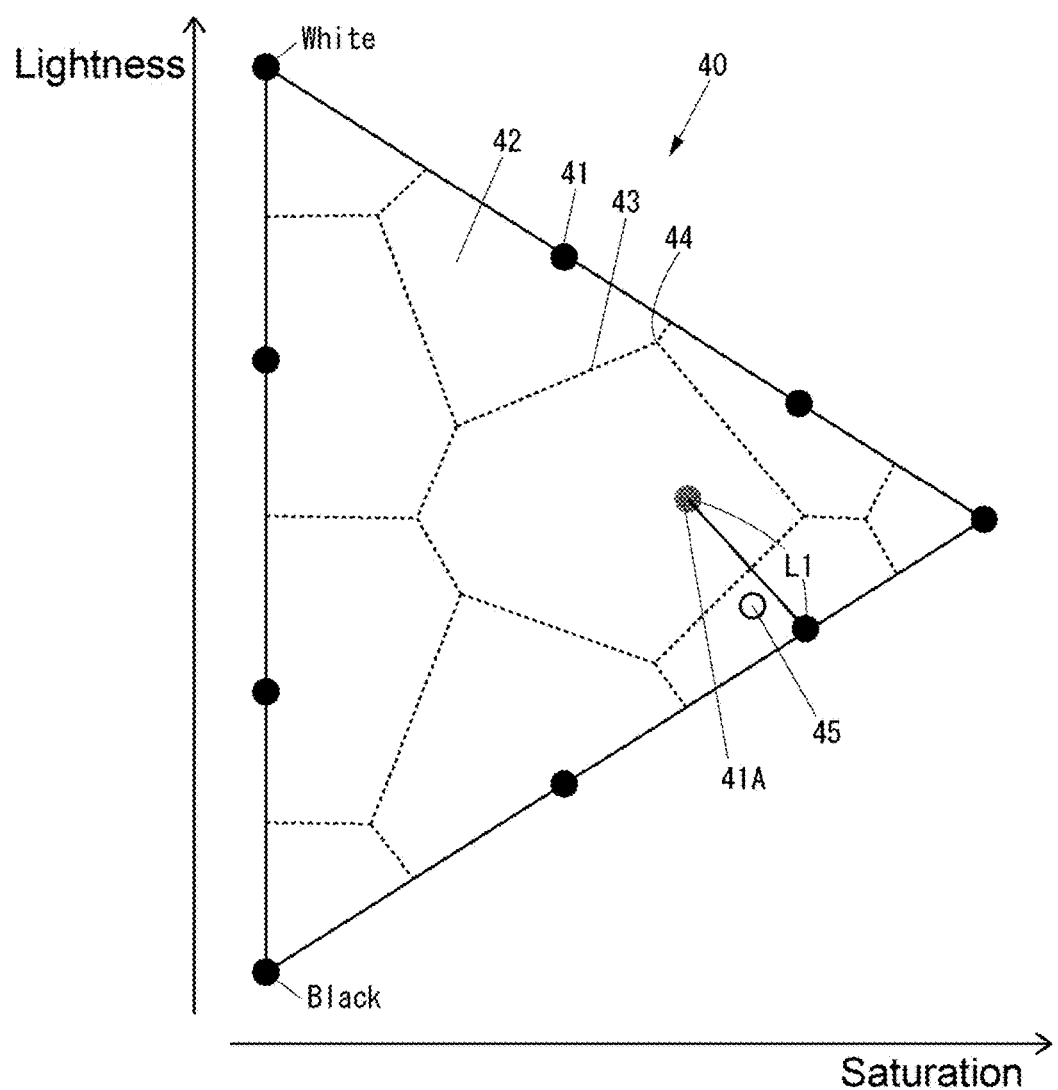
FIG. 11, in the operations illustrated in FIGS. 7 and 8, illustrates one example of the Voronoi diagram indicative of a distance between the target value and the generatrix of the measured-value Voronoi region.

FIG. 11 illustrates one example of the Voronoi diagram 40 that indicates the distance between the target value and the generatrix of the measured-value Voronoi region.

In FIG. 11, the distance L1 is a distance between the generatrix 41A as the target value and the generatrix 41 of the measured-value Voronoi region, namely the Voronoi region 42 that includes the measured value 45.

As illustrated in FIGS. 7 and 8, when determining that the measured value is not present inside at Step S173, the table generating unit 18b calculates the distance L1 between the target value and the generatrix of the measured-value Voronoi region (Step S176), calculates a distance L2 between the measured value 45 of the measured-value Voronoi region and an inner center 54a of the Delaunay triangle that includes the measured value (Step S177), and then calculates the correction distance by totaling two times of the distance L1 calculated at Step S176 and the distance L2 calculated at Step S177 (Step S178). The distance L2 is also referred to as a distance calculated by a second criterion.

Figure 12A:
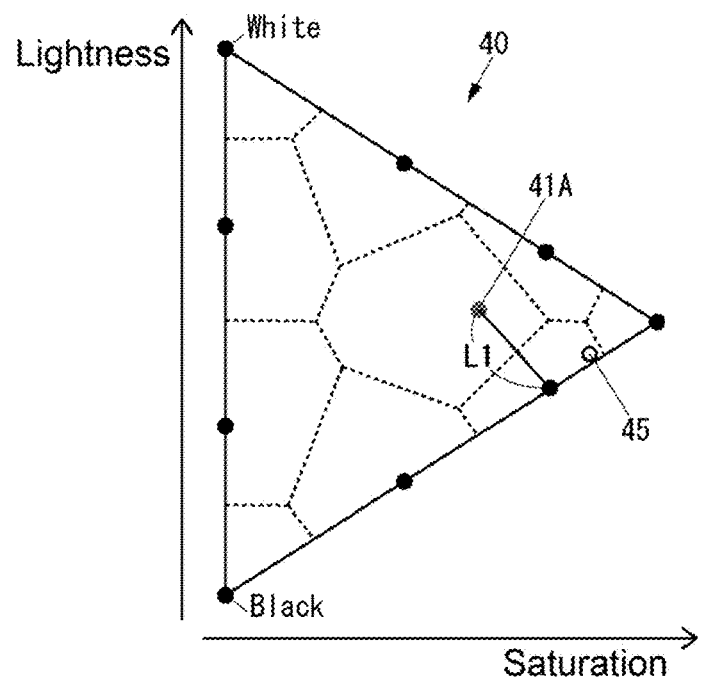
FIG. 12A, in the operations illustrated in FIGS. 7 and 8, illustrates one example of the Voronoi diagram indicative of the distance between the target value and the generatrix of the measured-value Voronoi region.
Figure 12B:
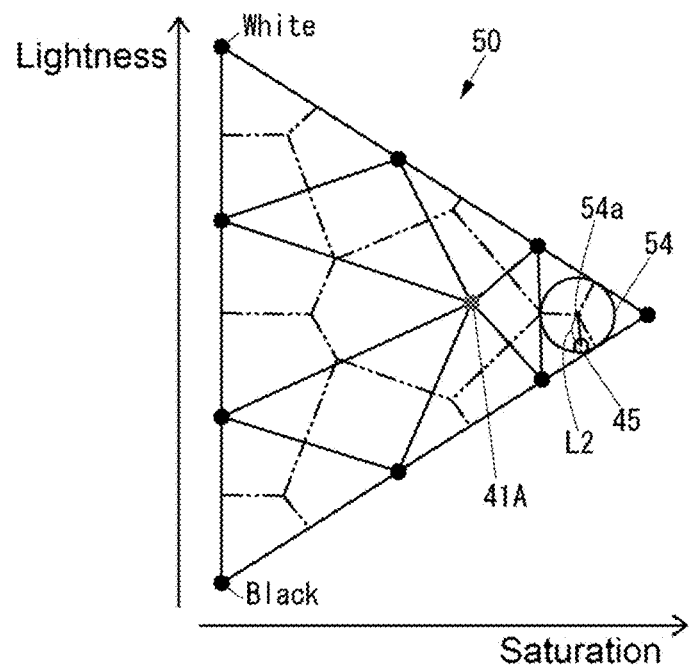
FIG. 12B, in the operations illustrated in FIGS. 7 and 8, illustrates one example of the Delaunay diagram indicative of a distance between the measured-value of the measured-value Voronoi region and an inner center of a Delaunay triangle that includes the measured value.

FIG. 12A illustrates one example of the Voronoi diagram 40 that indicates the distance between the target value and the generatrix of the measured-value Voronoi region. FIG. 12B illustrates one example of the Delaunay diagram 50 that indicates the distance between the measured value 45 of the measured-value Voronoi region and the inner center 54a of the Delaunay triangle that includes the measured value.

In FIG. 12A, the distance L1 is a distance between the generatrix 41A as the target value and the generatrix 41 of the measured-value Voronoi region, namely the Voronoi region 42 that includes the measured value 45.

In FIG. 12B, the distance L2 is a distance between the measured value 45 of the measured-value Voronoi region, namely the Voronoi region 42 that includes the measured value 45 and a center of an inscribed circle 54 of the Delaunay triangle 53 that includes the measured value 45, namely the inner center 54a.

As illustrated in FIGS. 7 and 8, after the process of Step S175 or the process of Step S178, the table generating unit 18b identifies a point of a position of the correction distance on the target value side (an opposite side of the measured value with respect to the target value) from the measured value as a correction point, on a straight line passing through the target value and the measured value (Step S179).

Figure 13A:
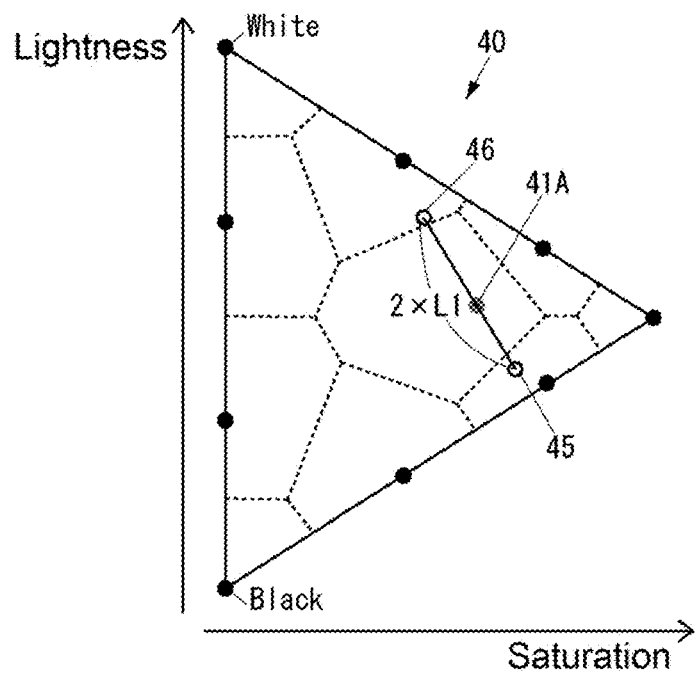
FIG. 13A, in the operations illustrated in FIGS. 7 and 8, illustrates one example of the Voronoi diagram indicative of a correction point when the measured value is present inside the Delaunay triangle that has the vertices of the target value and the generatrix of the measured-value Voronoi region.
Figure 13B:
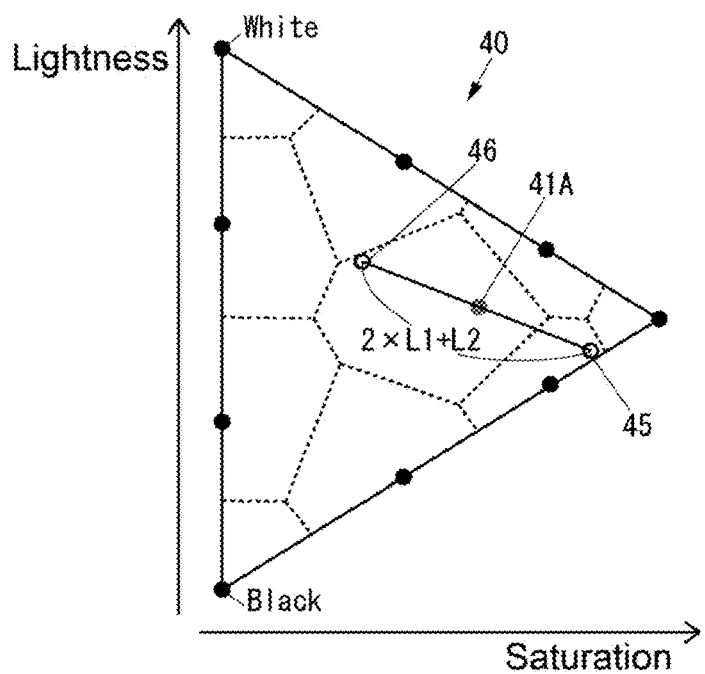
FIG. 13B, in the operations illustrated in FIGS. 7 and 8, illustrates one example of the Voronoi diagram indicative of the correction point when the measured value is not present inside the Delaunay triangle that has the vertices of the target value and the generatrix of the measured-value Voronoi region.

FIG. 13A illustrates one example of the Voronoi diagram 40 that indicates the correction point when the measured value is present inside the Delaunay triangle that has the vertices of the target value and the generatrix of the measured-value Voronoi region. FIG. 13B illustrates one example of the Voronoi diagram 40 that indicates the correction point when the measured value is not present inside the Delaunay triangle that has the vertices of the target value and the generatrix of the measured-value Voronoi region.

In FIG. 13A, a correction point 46 is a point of the position of the correction distance (2×L1) on the generatrix 41A side from the measured value 45, on the straight line passing the generatrix 41A as the target value and the measured value 45. The correction distance is also referred to as a distance calculated by a first criterion.

In FIG. 13B, the correction point 46 is a point of the position of the correction distance (2×L1+L2) on the generatrix 41A side from the measured value 45, on the straight line passing through the generatrix 41A as the target value and the measured value 45.

As illustrated in FIGS. 7 and 8, after the process of Step S179, the table generating unit 18b converts the Lab value of the correction point identified at Step S179 into the RGB value by interpolation calculation based on the RGB-to-Lab-to-CMYK table 17b (Step S180).

Subsequently, the table generating unit 18b stores the RGB value obtained at Step S180 as the RGB value that corresponds to the print position of the current target (Step S181).

After the process of Step S172 or S181, the table generating unit 18b determines whether all the print positions, which are printable on a recording medium by the printer 14, are targeted or not (Step S182).

When determining that the print position that is not yet targeted is present at Step S182, the table generating unit 18b executes the process of Step S168 for the print position that is not yet targeted.

When determining that all the print positions, which are printable on the recording medium by the printer 14, are targeted at Step S182, the table generating unit 18b generates the CMYK table 17d relative to the target RGB value by converting the "RGB value corresponding to the print position" stored at Step S172 or S181 into the CMYK value based on the RGB-to-Lab-to-CMYK table 17b (Step S183).

Subsequently, the table generating unit 18b stores the CMYK table 17d generated at Step S183 in the storage unit 17 (Step S184) and then terminates the operations illustrated in FIGS. 7 and 8.

Next, a description will be given of operations of the MFP 10 when execution of printing based on an input image is instructed.

Figure 14:
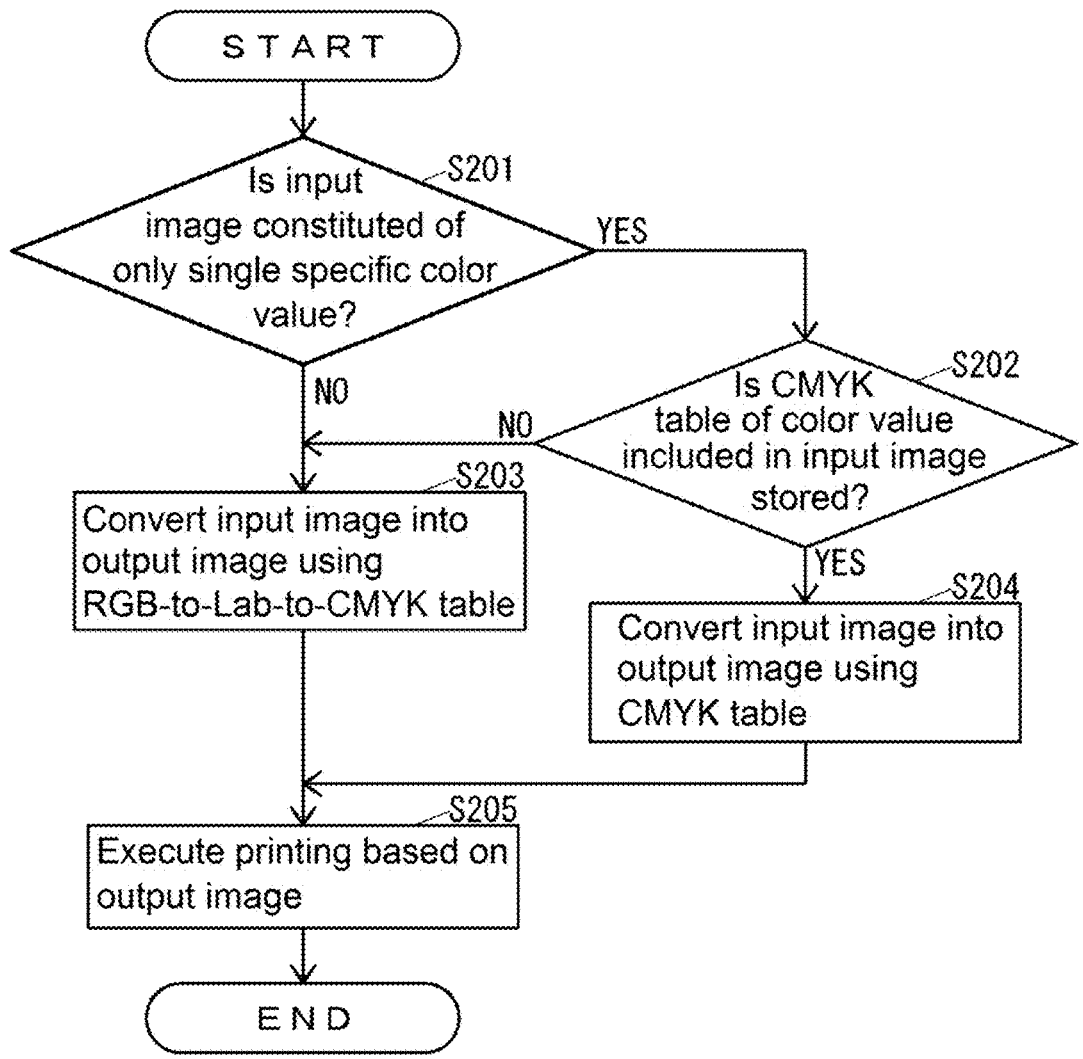
FIG. 14 illustrates operations of the MFP according to the one embodiment when execution of printing based on an input image is instructed.

FIG. 14 illustrates the operations of the MFP 10 when execution of printing based on the input image is instructed.

As illustrated in FIG. 14, the color conversion unit 18a determines whether the input image is an input image having a single color value or not (Step S201).

When determining that the input image is an input image having a single color value at Step S201, the color conversion unit 18a determines whether the CMYK table 17d of the color value included in the input image is stored in the storage unit 17 or not (Step S202).

When determining that the input image is not an input image having a single color value at Step S201, or when determining that the CMYK table 17d of the color value included in the input image is not stored in the storage unit 17 at Step S202, the color conversion unit 18a converts the input image into the output image using the RGB-to-Lab-to-CMYK table 17b (Step S203).

When determining that the CMYK table 17d of the color value included in the input image is stored in the storage unit 17 at Step S202, the color conversion unit 18a converts the input image into the output image using the CMYK table 17d of the color value included in the input image (Step S204).

After the process of Step S203 or Step S204, the color conversion unit 18a executes the print job based on the output image generated at Step S203 or Step S204 with the printer 14 (Step S205), and then terminates the operations illustrated in FIG. 14.

As described above, the MFP 10 sets an output color value in the CMYK table 17d, which defines the correspondence relationship between the print position and the output color value that corresponds to the specific input color value, as the color value in the hue plane that includes the specific input color value (Steps S172, S181 and S183). Thus, this ensures the reduced color unevenness depending on the print positions by correcting not only lightness but also saturation with respect to the output color value. Consequently, the MFP 10 ensures the improved ability of reducing color unevenness by the print position in a print job based on an input image having a single color value.

Generating the CMYK table 17d using the Voronoi diagram enables the MFP 10 to reduce a calculation amount required for generating the CMYK table 17d. Generating the CMYK table 17d using the Delaunay diagram enables the MFP 10 to further reduce a calculation amount required for generating the CMYK table 17d. Consequently, the MFP 10 enables generating the CMYK table 17d at high speed.

When the target-value Voronoi region and the measured-value Voronoi region are different (NO at Step S171), the MFP 10 calculates the distance between the output color value when the measured value is present inside any of the two Delaunay triangles that have the vertices of the specific input color value and the generatrix of the measured-value Voronoi region (YES at Step S173), and the measured value simply using the measured value indirectly (Steps S174 to S175). Consequently, this enables the MFP 10 to generate the CMYK table 17d at high speed.

When the target-value Voronoi region and the measured-value Voronoi region are different (NO at Step S171), the MFP 10 calculates the distance between the output color value when the measured value is present outside both of the two Delaunay triangles that have the vertices of the specific input color value and the generatrix of the measured-value Voronoi region (NO at Step S173), and the measured value simply using the measured value indirectly (Steps S176 to S178). Consequently, this enables the MFP 10 to generate the CMYK table 17d at high speed.

While in the embodiment the processes in FIG. 5 and the processes in FIGS. 7 and 8 are separately executed, the MFP 10 may execute the processes in FIG. 5 and the processes in FIGS. 7 and 8 as a series of processes. When the MFP 10 executes the processes in FIG. 5 and the processes in FIGS. 7 and 8 as a series of processes, it is only necessary that only any one of the processes of Steps S131 to S134 in the processes in FIG. 5 and the processes of Steps S161 to S164 in the processes in FIGS. 7 and 8 is executed.

While in the embodiment the Voronoi diagrams and the Delaunay diagrams for all the hue planes are prepared, the MFP 10 may, for example, after the process at Step S134, prepare the Voronoi diagram and the Delaunay diagram of the hue plane where the color value accepted at Step S134 is present.

While in the embodiment the MFP 10 executes all the processes, a part of the processes may be executed by an apparatus other than the MFP 10. For example, a color-measurement device that measures the color value at each print position in the recording medium printed by the printer 14 may be a device outside the MFP 10 not the scanner 13. That is, the MFP 10 and a color-measurement device outside the MFP 10 may constitute an image forming system.

While the image forming apparatus of the disclosure is an MFP in the embodiment, an image forming apparatus other than an MFP, such as a printer-only machine or a copy-only machine, may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
   a central processing unit (CPU);
   a print device that executes printing on a recording medium;
   a color-measurement device that measures a color value at each print position in the recording medium printed by the print device; and
   a storage device that stores an image forming program;
   wherein
   the CPU executes the image forming program to function as
   a color conversion unit that converts an input image into an output image for printing by the print device using a color conversion table; and
   a table generating unit that generates a second color conversion table based on a first color conversion table, the first color conversion table being the color conversion table that defines a correspondence relationship between input color values as color values of a colorimetric system of the input image and output color values as color values of a colorimetric system of the output image with respect to a specific count of colors, the second color conversion table being the color conversion table that defines a correspondence relationship between the print positions and the output color values corresponding to a specific input color value as one of the input color values, wherein
   when the color conversion unit converts the input image all over a surface of which is constituted of only the specific input color value into the output image using the first color conversion table, the table generating unit determines whether a target-value Voronoi region and a measured-value Voronoi region are identical or not at each of the print positions in the recording medium printed by the print device, in a Voronoi diagram in a hue plane of the specific input color value that includes a generatrix corresponding to a definition color defined in the first color conversion table, the target-value Voronoi region being a Voronoi region that includes the specific input color value, the measured-value Voronoi region being a Voronoi region that includes a measured value as a color value measured by the color-measurement device,
   the table generating unit sets the output color value associated with the print position where the target-value Voronoi region and the measured-value Voronoi region are identical in the second color conversion table as the output color value associated with the specific input color value in the first color conversion table, and
   the table generating unit sets the output color value associated with the print position where the target-value Voronoi region and the measured-value Voronoi region are different in the second color conversion table as a color value that is a color value in the hue plane and is different from the output color value associated with the specific input color value in the first color conversion table.

2. The image forming apparatus according to claim 1, wherein:
   the table generating unit sets the output color value associated with the print position where the target-value Voronoi region and the measured-value Voronoi region are different in the second color conversion table as a specific color value that is present on an opposite side from the measured value with respect to the output color value associated with the specific input color value in the first color conversion table;

when the measured value is present inside any of two Delaunay triangles that have vertices of the specific input color value and the generatrix of the measured-value Voronoi region in a Delaunay diagram corresponding to the Voronoi diagram, a distance between the measured value and the specific color value is a distance calculated by a first criterion; and when the measured value is present outside both of the two Delaunay triangles in the Delaunay diagram, the distance between the measured value and the specific color value is a distance where a distance calculated by a second criterion different from the first criterion is added to the distance calculated by the first criterion.

3. The image forming apparatus according to claim 2, wherein the distance calculated by the first criterion is a distance that is twice as long as the distance between the specific input color value and the generatrix of the measured-value Voronoi region.

4. The image forming apparatus according to claim 3, wherein the distance calculated by the second criterion is a distance between the inner center of the Delaunay triangle that includes the measured value in the Delaunay diagram and the measured value.

5. A non-transitory computer-readable recording medium storing an image forming program to control an image forming apparatus, the image forming program causing the image forming apparatus including a print device that executes printing on a recording medium and a color-measurement device that measures a color value at each print position in the recording medium printed by the print device to function as:

a color conversion unit that converts an input image into an output image for printing by the print device using a color conversion table; and a table generating unit that generates a second color conversion table based on a first color conversion table, the first color conversion table being the color conversion table that defines a correspondence relationship between input color values as color values of a colorimetric system of the input image and output color values as color values of a colorimetric system of the output image with respect to a specific count of colors, the second color conversion table being the color conversion table that defines a correspondence relationship between the print positions and the output color values corresponding to a specific input color value as one of the input color values; wherein when the color conversion unit converts the input image all over a surface of which is constituted of only the specific input color value into the output image using the first color conversion table, the table generating unit determines whether a target-value Voronoi region and a measured-value Voronoi region are identical or not at each of the print positions in the recording medium printed by the print device, in a Voronoi diagram in a hue plane of the specific input color value that includes a generatrix corresponding to a definition color defined in the first color conversion table, the target-value Voronoi region being a Voronoi region that includes the specific input color value, the measured-value Voronoi region being a Voronoi region that includes a measured value as a color value measured by the color-measurement device, the table generating unit sets the output color value associated with the print position where the target-value Voronoi region and the measured-value Voronoi region are identical in the second color conversion table as the output color value associated with the specific input color value in the first color conversion table, and the table generating unit sets the output color value associated with the print position where the target-value Voronoi region and the measured-value Voronoi region are different in the second color conversion table as a color value that is a color value in the hue plane and is different from the output color value associated with the specific input color value in the first color conversion table.

6. An image forming system comprising:

a color-measurement device that measures a color value at each print position in the recording medium printed by the print device; and an image forming apparatus;

the image forming apparatus including
a central processing unit (CPU),
a print device that executes printing on a recording medium, and
a storage device that stores an image forming program;

wherein the CPU executes the image forming program to function as a color conversion unit that converts an input image into an output image for printing by the print device using a color conversion table, and a table generating unit that generates a second color conversion table based on a first color conversion table, the first color conversion table being the color conversion table that defines a correspondence relationship between input color values as color values of a colorimetric system of the input image and output color values as color values of a colorimetric system of the output image with respect to a specific count of colors, the second color conversion table being the color conversion table that defines a correspondence relationship between the print positions and the output color values corresponding to a specific input color value as one of the input color values, wherein when the color conversion unit converts the input image all over a surface of which is constituted of only the specific input color value into the output image using the first color conversion table, the table generating unit determines whether a target-value Voronoi region and a measured-value Voronoi region are identical or not at each of the print positions in the recording medium printed by the print device, in a Voronoi diagram in a hue plane of the specific input color value that includes a generatrix corresponding to a definition color defined in the first color conversion table, the target-value Voronoi region being a Voronoi region that includes the specific input color value, the measured-value Voronoi region being a Voronoi region that includes a measured value as a color value measured by the color-measurement device, the table generating unit sets the output color value associated with the print position where the target-value Voronoi region and the measured-value Voronoi region are identical in the second color conversion table as the output color value associated with the specific input color value in the first color conversion table, and the table generating unit sets the output color value associated with the print position where the target-value Voronoi region and the measured-value Voronoi region are different in the second color conversion table as a color value that is a color value in the hue plane and is different from the output color value associated with the specific input color value in the first color conversion table.

7. An image forming method comprising:
converting an input image into an output image for printing by the print device that executes printing on a recording medium using a color conversion table; and
generating a second color conversion table based on a first color conversion table, the first color conversion table being the color conversion table that defines a correspondence relationship between input color values as color values of a colorimetric system of the input image and output color values as color values of a colorimetric system of the output image with respect to a specific count of colors, the second color conversion table being the color conversion table that defines a correspondence relationship between the print positions and the output color values corresponding to a specific input color value as one of the input color values; wherein
when the converting converts the input image all over a surface of which is constituted of only the specific input color value into the output image using the first color conversion table, the generating determines whether a target-value Voronoi region and a measured-value Voronoi region are identical or not at each of the print positions in the recording medium printed by the print device, in a Voronoi diagram in a hue plane of the specific input color value that includes a generatrix corresponding to a definition color defined in the first color conversion table, the target-value Voronoi region being a Voronoi region that includes the specific input color value, the measured-value Voronoi region being a Voronoi region that includes a measured value as a color value measured by a color-measurement device for measuring a color value at each of the print positions in the recording medium printed by the print device,
the generating sets the output color value associated with the print position where the target-value Voronoi region and the measured-value Voronoi region are identical in the second color conversion table as the output color value associated with the specific input color value in the first color conversion table, and
the generating sets the output color value associated with the print position where the target-value Voronoi region and the measured-value Voronoi region are different in the second color conversion table as a color value that is a color value in the hue plane and is different from the output color value associated with the specific input color value in the first color conversion table.

* * * * *